United States Patent
Fütterer

[11] Patent Number: 5,098,206
[45] Date of Patent: Mar. 24, 1992

[54] SHAFT BEARING ASSEMBLY FOR A MINIATURE ELECTRIC MOTOR

[75] Inventor: Bodo Fütterer, Luzern, Switzerland

[73] Assignee: Interelectric AG, Sachsein, Switzerland

[21] Appl. No.: 659,242

[22] Filed: Feb. 22, 1991

[51] Int. Cl.⁵ ............................................. F16C 17/10
[52] U.S. Cl. .................................. 384/275; 384/279; 384/370; 384/411
[58] Field of Search ............... 384/275, 279, 370, 371, 384/397, 411

[56] References Cited

U.S. PATENT DOCUMENTS

| Re. 27,998 | 4/1974 | Abel | 384/411 |
| 213,310 | 3/1879 | Yeo | 384/275 |
| 2,752,208 | 6/1956 | Wightman | 384/370 |
| 3,450,448 | 6/1969 | Weichsel | 384/279 |

Primary Examiner—Lenard A. Footland
Attorney, Agent, or Firm—Fulwider, Patton, Lee & Utecht

[57] ABSTRACT

A shaft bearing assembly, particularly for a miniature electric motor. In the case of the present shaft bearing assembly, an oil-impregnated dampening disc made of an absorbent material the capillary action of which is greater than that of the porous bearing block is disposed between the thrust collar of the shaft and the axial end face of the bearing block. The shaft bearing assembly is particularly suitable for electric motors of smaller size and is effective in reducing motor noise.

4 Claims, 1 Drawing Sheet

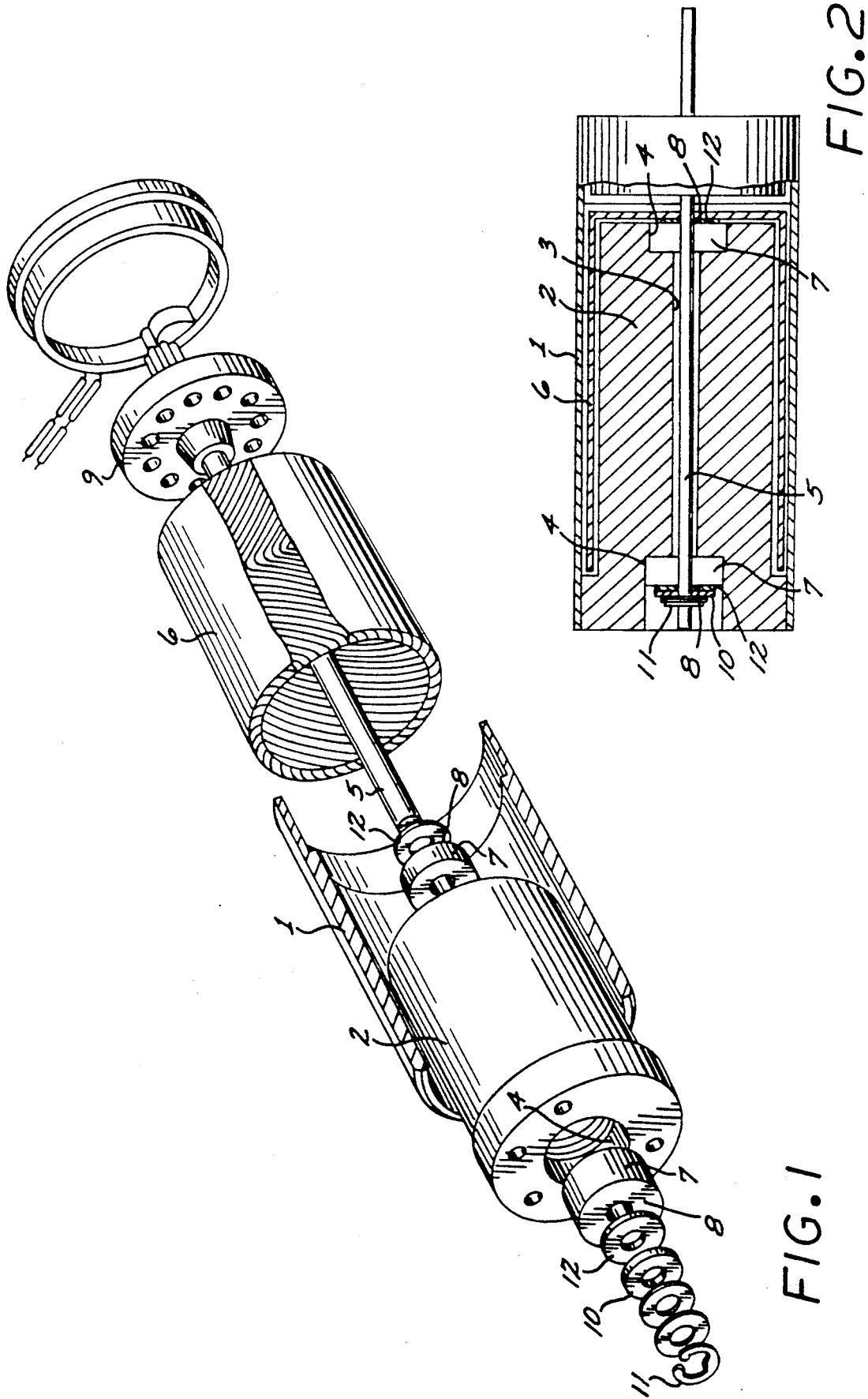

SHAFT BEARING ASSEMBLY FOR A MINIATURE ELECTRIC MOTOR

BACKGROUND OF THE INVENTION

The invention relates to a shaft bearing assembly, particularly for a miniature electric motor, comprising at least one bearing block made of a porous oil-impregnated material and formed with a bearing bore for receiving a shaft therein, and with an axial surface facing a thrust collar provided on said shaft.

Bearing assemblies of this type are commonly used in the field of miniature motor construction. The bearing blocks are generally made of sintered bronze and adapted to store a small oil supply sufficient for a hydrodynamic support of the shaft in the radial direction. The shaft is axially fixed by a thrust collar provided on the shaft, for instance, a thrust bearing disc mounted on the shaft so as to abut an end face of the bearing block. Usually, there are two bearing blocks provided at the opposite free ends of the shaft, the respective thrust collars permitting a certain axial play of the shaft. Although this play is indispensable for insuring low-friction rotation of the shaft, it permits the shaft to oscillate in the axial direction, resulting in the creation of undesirable noise, the axial oscillations causing the thrust collars to collide with the axial faces of the bearing blocks. If one considers that these miniature motors are employed in particularly noise-sensitive appliances, such as HiFi tape recorders or video recorders, it is evident that the reduction of the running noise of such a motor is of enormous importance.

It is therefore an object of the invention to reduce the noises resulting from axial displacements of the shaft in the shaft bearing assembly.

The object is attained according to the invention by the provision that between the thrust collar of the shaft and the axial surface of the bearing block there is provided an oil-impregnated dampening disc made of an absorbent material the capillary action of which is greater than that of the porous bearing block.

The absorbent material of the dampening disc acts as a cage for the oil contained in the material. The material of the dampening disc is thus in fact effective to captivate a drop of oil and to retain it in the gap between the axial face of the bearing block and the thrust collar. The thus persistent presence of the drop of oil is effective to dampen the axial oscillations of the shaft, resulting in an enormous reduction of the noises otherwise generated thereby. The fact that the capillary action of the material of the dampening disc is greater than that of the porous bearing block is effective to prevent the oil from the dampening disc to be sucked into the bearing block. Quite to the contrary, the greater capillary action of the dampening disc causes oil from the bearing block to be sucked into the dampening disc, so that the latter is always saturated with oil. Since no oil can escape from the dampening disc, an equilibrium is established between the oil husbandry of the dampening disc and that of the bearing block.

The distance between the bearing block and the thrust collar advantageously corresponds substantially to the thickness of the oil-impregnated dampening disc. The dampening disc may definitely be inserted with a certain play in the gap between the bearing block and the thrust collar. A suitable material for making the dampening disc may, for instance, be an oil-resistant fiber fleece. It has been found particularly suitable to use a synthetic leather material for making the dampening disc. This material inherently has a greater capillary action than the conventionally employed sintered bronze bearings, and is also sufficiently oil resistant.

An embodiment of the invention shall now be described by way of example with reference to the accompanying drawings, wherein.

BRIEF DESCRIPTION OF THE DRAWINGS

FIG. 1 shows an exploded perspective view, partially in section, of a miniature electric motor; and FIG. 2 shows an axially sectioned view of the motor of FIG. 1.

DETAILED DESCRIPTION OF THE INVENTION

The drawings show an enlarged illustration of a miniature electric motor of the type used as a drive source in tape recorders and the like. The motor comprises an outer housing 1 in which a permanent magnet 2 acting as a stator is mounted at a concentric position. A shaft bore 3 extends through permanent magnet 2 and opens at the end faces thereof in radially enlarged countersunk portions 4. A rotor shaft 5 extending through shaft bore 3 carries a rotor, non-rotatably secured thereon in the form of a cup-shaped coil body 6 enclosing the permanent magnet.

Inserted into countersunk bore portions 4 are bearing blocks 7 of porous sintered bronze. Each bearing block 7 has a calibrated bore for the radial support of shaft 5, and at least one substantially flat axial end face 8. The radially extending portion of coil body 6 immediately adjacent shaft 5 is formed as a thrust collar 9 and secured to shaft 5 at an axially fixed position.

Mounted on the other end of rotor shaft 5 projecting through bearing block 7 is a thrust washer 10 secured in position on shaft 5 by a shaft locking ring 11.

Interposed between thrust collar 9 and thrust washer 10, respectively, and the associated axial end faces 8 of bearing block 7 is a respective dampening disc 12 made of an absorbent flexible material, in the case of the described embodiment of a synthetic window-cleaning leather commercially available under the name of "Vileda." Prior to assembly dampening disc 12 as well as bearing blocks 7 have been impregnated with oil. The material of the dampening disc is selected so that its capillary action is greater than that of the porous bearing blocks 7. As a result, the dampening disc 12 always endeavors to suck oil from the associated bearing block 7. This will lead, however, to a state of equilibrium, because the dampening disc 12 cannot release the oil to the exterior. The greater capillary action of the dampening disc 12 is also effective to prevent the oil being sucked therefrom by the bearing blocks 7, which would otherwise result in the dampening disc 12 loosing its dampening characteristics. The distance between thrust washer 10 or thrust collar 9, respectively, and the associated axial end face 8 of the adjacent bearing block 7 is selected so as to permit the dampening disc 12 to be fitted therebetween, either with a small amount of play, or under slight compression.

The function of the shaft bearing assembly according to the invention shall now be explained in detail. When the motor runs, and shaft 5 rotates, a hydrodynamic lubricant flow supporting shaft 5 is generated in the bores of bearing blocks 7. Axial oscillations of the shaft are dampened by the dampening discs 12. Accurately speaking, the dampening effect is not brought about by the dampening disc itself, but rather by the oil stored in the dampening disc. The material of the dampening disc 12 acts in the manner of a cage capturing a drop of oil fed into the gap between the bearing block 7 and thrust washer 10 or thrust collar 9, respectively. Also, since the capillary action of the material of the dampening disc is always greater than that of the bearing blocks 7, this drop of oil cannot escape from the gap between the bearing block and the thrust collar, or the thrust washer, respectively. The excellent dampening characteristics are therefore retained over a great number of hours of operation, although the material of the dampening disc, taken by itself, is not overly resistant. The shaft bearing assembly according to the invention is thus effective to strongly reduce the generation of noises caused by longitudinal oscillations of the shaft 5.

It is also conceivable to make the dampening disc 12 of different materials, it being important, however, that the capillary action of the material must never be less than the capillary action of the sintered bearings, since the oil would otherwise be sucked from the dampening discs.

It is apparent from the foregoing that a new and improved shaft bearing assembly is provided. It will be apparent to those familiar with the art that other modifications and improvements can be made without departing from the scope of the invention as defined by the following claims.

What is claimed is:

1. A shaft bearing assembly, comprising at least one bearing block made of a porous oil-impregnated material and formed with a bearing bore for receiving a shaft therein, and with an axial surface facing a thrust collar provided on said shaft, characterized in that between said thrust collar of said shaft and said axial surface of said bearing block there is provided an oil-impregnated dampening disc made of an absorbent material the capillary action of which is greater than that of said porous bearing block.

2. A shaft bearing assembly according to claim 1, wherein said bearing block is spaced from said thrust collar by a distance approximately corresponding to the thickness of said oil-impregnated dampening disc.

3. A shaft bearing assembly according to claim 1 or 2, wherein said dampening disc is made of an oil-resistant fibre fleece.

4. A shaft bearing assembly according to claims 1 or 2, wherein said dampening disc is made of a synthetic leather material.

* * * * *